March 5, 1968    B. M. BELLMAN ETAL    3,372,389
DOPPLER RADAR SYSTEM

Filed Feb. 13, 1967    2 Sheets-Sheet 1

WITNESSES
Helen M. Farkas
James F. Young

INVENTORS
Brian M. Bellman
Guy H. Bias, Jr.
Thomas M. Moore
BY R. Lewis Gable
ATTORNEY March 5, 1968 B. M. BELLMAN ET AL 3,372,389
DOPPLER RADAR SYSTEM
Filed Feb. 13, 1967 2 Sheets-Sheet 2
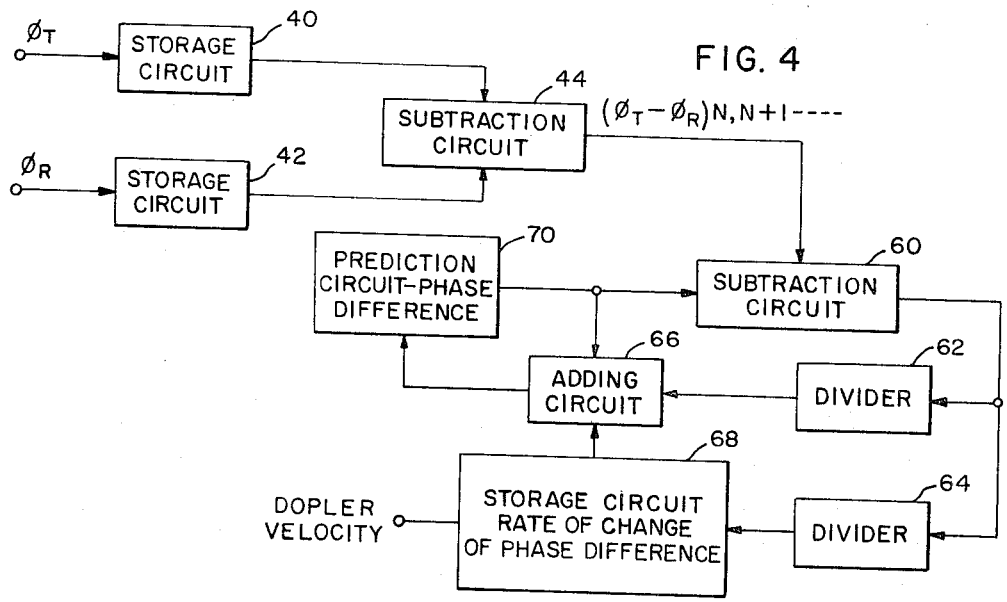
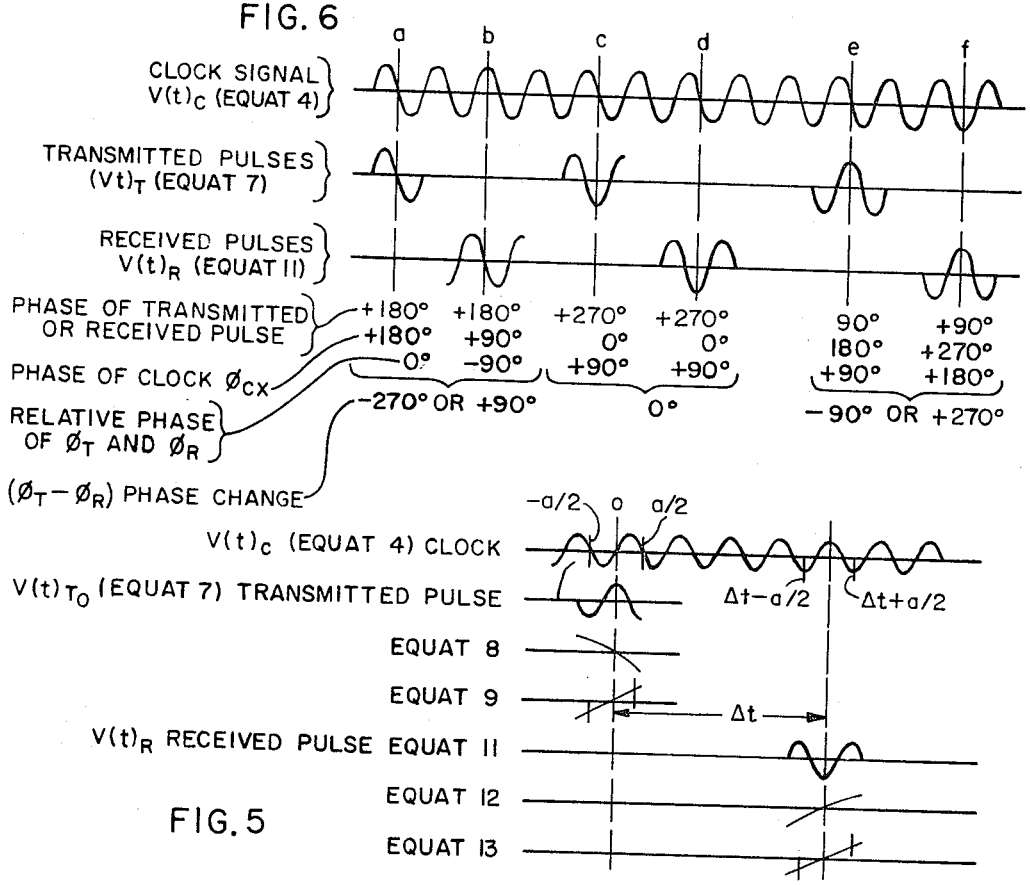

United States Patent Office 3,372,389
Patented Mar. 5, 1968

3,372,389
DOPPLER RADAR SYSTEM
Brian M. Bellman, Severna Park, Guy H. Bias, Jr., Baltimore, and Thomas M. Moore, Severna Park, Md., assignors to Westinghouse Electric Corporation, Pittsburgh, Pa., a corporation of Pennsylvania
Filed Feb. 13, 1967, Ser. No. 615,489
8 Claims. (Cl. 343—8)

ABSTRACT OF THE DISCLOSURE

This invention relates to a Doppler radar system illustratively including a free running oscillator such as a magnetron tube for generating a high powered, transmission signal, an antenna for radiating the transmission onto a moving object and for receiving the return or echo signal, a clock for providing a continuous signal of controlled frequency, phase detecting circuitry for measuring the relative phase of the transmission signal at the time of transmission with respect to the phase of the continuous clock signal and for measuring the relative phase of the return signal at the time of reception with respect to the continuous clock signal, and computing circuitry for measuring the round trip time of the transmitted signal in terms of phase and for determining the rate of change of the round trip transmission time for successive pulses of the transmission signal.

---

This invention relates to radar systems and more particularly to those systems utilizing the phenomenon known as the Doppler effect for determining the range rate of a moving object.

As is well known, the Doppler effect is the change in frequency undergone by a wave transmitted between two relatively moving objects. More specifically, if a wave is transmitted from one of the moving bodies, then an observer upon the other body will notice a shift in the frequency of the wave dependent upon the magnitude and the direction of the relative velocity between the bodies. Further, if one of the relatively moving bodies transmits a wave which is reflected from the other body and received again at the first body the amount of frequency shift may be expressed by the formula:

$$\Delta f = \frac{2fV}{C-V} \text{ or } \frac{2fV}{C} \text{ (when } C \gg V\text{)} \tag{1}$$

where $\Delta f$ is the change in frequency known as the Doppler shift, $f$ is the frequency of the transmitted wave, $V$ is the relative velocity between the moving bodies and $C$ is the velocity of the wave through the media. In the case of electromagnetic waves directed through a vacuum, $C = 3.2785 \times 10^8$ yards per second. Further, the frequency of the received signal ($f_r$) is:

$$f_r = f + \Delta f \tag{2}$$

From Equation 1, it is clear that by measuring the Doppler frequency shift $\Delta f$, it is possible to determine the radial component of the relative velocity between the two objects.

In the prior art, frequency has been measured by counting the number of cycles of the return wave per unit measure of time. However, the cycle counting process has two basic difficulties where it is necessary to provide output data at a rapid rate. Because the technique is based on counting whole cycles per unit of time, the system has an inherent granularity of 1 cycle per unit of time. In a typical radar system, the measured velocities are such that accurate indications would require a frequency shift of approximately 1 cycle per second. Therefore, in a cycle counting system, a whole second is required before the frequency change is observed, which is unacceptable since this is many times greater than the required data readout rate. Secondly, in typical radar systems, the data is sampled in form; that is, target information is available only for a short period (typically $1/2\mu$ sec.) at long intervals apart (typical pulse repetition rates approximately equal $2 \times 10^3 \mu$ sec.). In general, the sampling period will not coincide with an exact Doppler cycle. Thus, a cycle counting technique requires the presentation of continuous data thus limiting the processing that can be performed on this data.

Frequency can be expressed in terms of phase by the following expression:

$$f = \frac{\Delta \phi}{\Delta t} \tag{3}$$

Equation 3 provides another technique of measuring the Doppler frequency shift in which the phase of the return wave is sampled. As a result, only a small portion of a single cycle of the return wave is sampled and the granularity can be reduced by more than 100 to 1. Further, phase can be detected on each pulse, thereby allowing greater latitude in the type of processing that can be performed on the output data.

A radar system of the prior art typically includes a transmitter for generating a high powered signal whose frequency is precisely controlled by a suitable clock mechanism. In turn, the high powered signal is directed or radiated by an antenna onto the object whose velocity is to be measured. The wave reflected from the relatively moving object is usually received by the same antenna and is directed to a suitable receiver by a switch called a duplexer. In turn, the receiver has a phase detecting circuit which compares the received signal with the signal provided by the clock mechanism. The transmitter typically includes a power amplifier such as a Klystron tube. The power amplifier is energized or activated for a short period by a modulator or a video pulse generator to provide a pulse of output signal. The signal to be amplified is generated by a clock mechanism which thereby accurately determines the frequency of the transmitted signal. Thus in conventional Doppler radar systems, pulses of a signal coherent with a clock mechanism (i.e., directly amplified from and therefore phase locked to the clock mechanism) are radiated onto the relatively moving object; the reflected wave is received and the frequency or phase of the received signal is compared with respect to the signal provided by the clock mechanism to determine the Doppler frequency shift. Referring to Equation 1, it is particularly noticed that $f$ represents the frequency of the transmitted signal and that the prior art has taken great pains to insure the accuracy and the stability of the frequency ($f$) of the transmitted signal. In such coherent radar systems, it is typically necessary to employ power amplifiers which can be accurately controlled such as the Klystron tube; it may be understood that these devices are quite expensive and add substantially to the cost of the overall system.

It is, therefore, an object of this invention to provide a new and improved Doppler radar system.

It is a more specific object of this invention to provide a new and improved Doppler radar system which avoids the use of a transmitter whose output wave is of a precisely controlled frequency.

These and other objects are accomplished in accordance with the teachings of this invention by providing a Doppler radar system including a free-running transmitter oscillator, a suitable antenna for radiating a transmitted signal and for receiving the reflected signal, a clock mechanism for generating a continuous signal of precise frequency, and first and second detectors for respectively sampling the relative phase of the transmitted signal with respect to the clock signal and the relative phase of the received signal with respect to the clock signal. In accordance with the teachings of this invention, the velocity is determined by measuring the change of round trip time from pulse to pulse. More specifically, the round trip time is determined by measuring the relative phase of the transmitted signal with respect to the phase of the clock signal and the relative phase of the return signal with respect to the phase of the clock signal. In order to measure the velocity of the object being tracked, suitable storage circuits are provided to hold the signals corresponding to the relative phase of the transmitted and received signals respectively and to subtract these signals from each other to determine the round trip transmission time in terms of phase. Next, a second set of storage circuits serve to retain the signals corresponding to the round trip transmission time of successive signals and an additional subtraction circuit is provided for obtaining the difference in terms of relative phase between the transmission time for the successive pulses. As will be shown in the specification, rate of change of the transmission times is proportional to the velocity of the object being tracked.

In a further embodiment of this invention, an error loop is used to process the information from the above-described Doppler radar system. The error loop includes suitable circuits for predicting the change of round trip time in terms of phase and for storing this information. Further, the predicted round trip transmission time is directed into a subtraction circuit to obtain an error difference between the predicted round trip time and the actual transmission time. The error signal is used to improve future estimates of the predicted signal.

In a further embodiment of this invention, the first and second phase detectors may be replaced by a single circuit by the use of a switch disposed to alternatively connect the phase detector to receive the transmitted signal and the received signal.

These and other objects and advantages of the present invention will become more apparent in view of the following detailed description and drawings, in which:

FIG. 4 is a schematic representation of a alternative processing system including a closed error loop with a storage and error predicting circuit; and FIGS. 5 and 6 are time diagrams respectively illustrating the processing of the information taking place in the circuits of FIGS. 1, 2 and 3.

Figure 1:
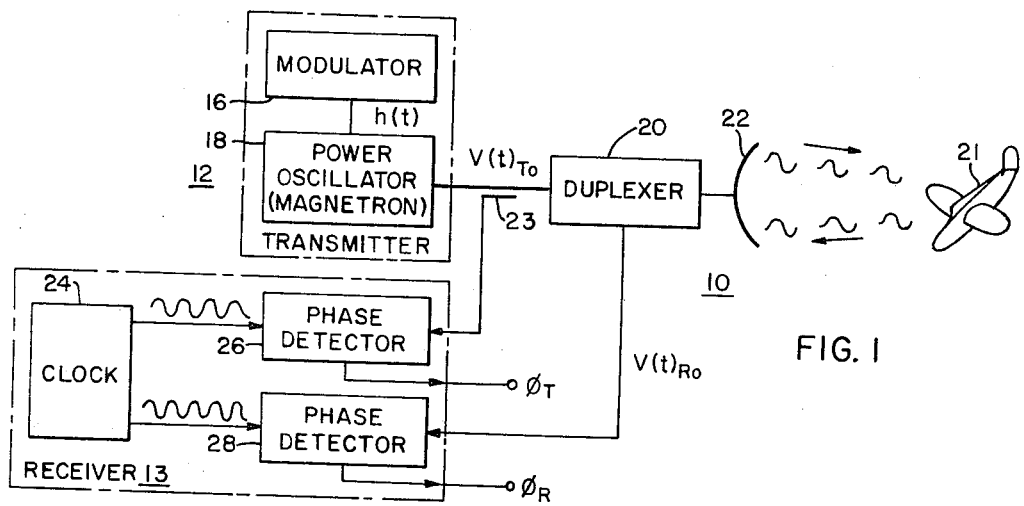
FIGURE 1 is a schematic representation of an illustrative Doppler radar system in accordance with the principles of this invention.

Referring now to the drawings and in particular to FIG. 1, there is shown a Doppler radar system 10 including a transmitter 12 for providing a free running series of pulses to be directed through a duplexer 20 and to be radiated by an antenna 22. More specifically, the transmitter 12 includes a continuous wave power oscillator 18 for providing a continuous wave signal of a suitable high frequency such as in the C-band. The continuous wave signal is controlled by a modulator 16, which in turn shapes the envelope of the output signal of the power oscillator 18. It is a significant aspect of this invention that the power oscillator 18 can be a free running device. The frequency of the output of the power oscillator 18 does not have to be precisely controlled and may vary considerably from that normally required by Doppler radar systems of the prior art. Illustratively, the power oscillator may be a magnetron tube such as a type QK662, the use of which substantially reduces the cost of the entire radar system 10.

The wave transmitted from the antenna 22 strikes an object 21 whose velocity is desired to be measured and a return wave or echo is sent back toward the antenna 22. A signal corresponding to the return wave received by the antenna 22 is directed by the duplexer 20 into a phase detector 28 of a receiver 13. As is well recognized in the art, the function of the duplexer 20 is to alternately switch the antenna 22 to the transmitter 12 thus allowing the high power wave generated therefrom to be radiated by the antenna 22 and to switch the antenna 22 to allow the low powered return signal to be applied to the receiver 13.

Further, a coupler 23 is provided to sense the output signal of the transmitter 12. The coupler 23 is connected to a phase detector 26, which acts to measure the relative phase of the transmitted signal with respect to a clock signal of precise frequency generated by a clock mechanism 24 and applied to the phase detector 26. Similarly, the clock 24 provides a clock signal of precise frequency to the phase detector 28, which functions to measure the relative phase of the return or echo signal with respect to the phase of the clock signal.

It is a significant aspect of the invention that the frequency of the radiated signal neither be a known nor controlled within close tolerance. More specifically, it is the frequency of the continuous signal provided by the clock 24 that must be both stable and known. However, to allow the phase of the transmitted signal to be measured with respect to the signal of the clock 24, the phase of the transmitted signal relative to the clock must not change more than $2\pi$ during the pulse length so that the ambiguities of the phase of the transmitted signals at $2\pi$ intervals would give an ambiguous phase reading. A $2\pi$ phase change in the $1\mu$ sec. of the pulse length is one cycle in a microsecond, or stated in conventional terms, is a megacycle per second. In practice, the frequency of the transmitted signal, which is generated by a device such as a magnetron tube, can be held to a much closer tolerance.

Figure 2:
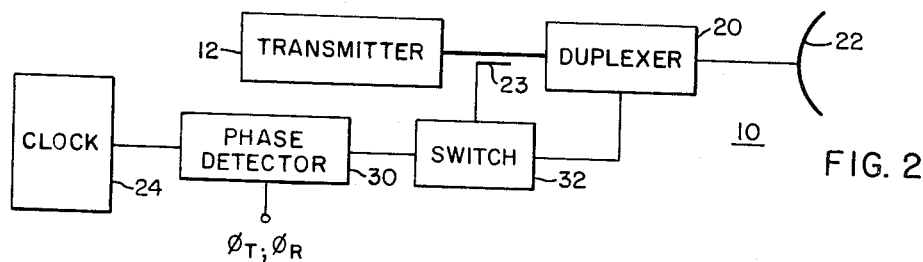
FIG. 2 is a schematic representation of a further embodiment of the Doppler radar system in accordance with the teachings of this invention.

In an alternative embodiment of the radar system 10, a single phase detector 30 is utilized in place of the two phase detectors employed in the system of FIG. 1. More specifically the radar system 10 of FIG. 2 includes the transmitter 12 for generating a high power signal through the duplexer 20 to be radiated by the antenna 22. The return signal from the antenna 22 is directed by the duplexer 20 to a switch 32 which selectively applies the return signal to the phase detector 30. Further, the coupler 23 senses the transmitted signals and is likewise selectively applied by the switch 32 to the phase detector 30. In accordance with the teachings of this invention, the clock 24 applies a clock signal of precise, determined frequency to the phase detector 30. The switch 32 alternately applies the transmitted and received signals to the phase detector 30, which acts to measure the relative phase of these respective signals with respect to the phase of the clock signal. It may be understood that the essential operation of the phase detector 30 is to obtain a signal representing the differences between the phase of the clock signal and the return and transmitted signals. Therefore, the use of a single phase detector 30 has the significant advantage that the inherent irregularities and noises of the phase detector 30 are applied to both the received and transmitted signals and when in a latter operation (as will be explained) these relative phase signals are subtracted, the noises or irregularities presented by the phase detector 30 will be cancelled out.

With regard to FIGS. 1 and 5, it will be demonstrated that the data provided by a coherent transmitter, typical of the prior art, and the non-coherent free running transmitter as disclosed by this invention are the same. The signal $V(t)_c$ provided by the clock mechanism 24 may be represented by the following expression:

$$V(t)_c = SIN\ w_c t \qquad (4)$$

Where $w_c$ is the precisely controlled frequency of the clock mechanism 24, typically in the C-band. The transmitter 12 generates a signal having pulses of approximately the same frequency as the clock mechanism but not controlled or linked to the clock mechanism; the transmitted signal $V(t)_{Tn}$ may be represented by the following expression:

$$V(t)_{Tn} = h(t)\ \sin\ w_{Tn} + \theta_n \qquad (5)$$

where $h(t)$ is a modulating function applied to the transmitted signal by the modulator 16, and $w_{Tn}$ and pulse $\theta_n$ are respectively the frequency and the phase of the transmitter on pulse $n$. Further, the frequency $w_{Tn}$ of the non-coherent transmitter 12 may be expressed by the following equation:

$$w_{Tn} = w_c + w_n \qquad (6)$$

where $w_n$ is the difference between the clock and transmitter frequencies. For the purposes of this demonstration, only one pulse will be considered. More particularly, the particular case where $n=0$ will be examined. For this case, Equation 5 may now be rewritten as:

$$V(t)_{T0} = h_0(t)\ \sin\ [(w_0 + w_c)t + \theta_0] \qquad (7)$$

As shown in FIG. 1, the phase detector 26 compares the signal given by Equation 7 and the signal given by Equation 4 to obtain a different signal $V(t)_{DT}$ which, since the input frequencies are approximately equal can be expressed by the following equation:

$$V(t)_{DT} = h_0(t)\ \sin\ (w_0 t + \theta_0) \qquad (8)$$

By inspection of Equation 8 and FIG. 5, it can be seen that the average phase $\phi_T$ of the difference signal $V(t)_{DT}$ becomes:

$$\phi_T = \theta_0 \qquad (9)$$

because the average phase $\phi_T$ changes linearly from $-w_0 a/2 + \theta_0$, at $t = -a/2$, to $+ w_0 a/2 + \theta_0$, at $t = a/2$, where $a$ is the length of the pulse. In this analysis, the phase will be measured at the midpoint of the pulse.

Having derived an expression for the average relative phase $\phi_T$ of the transmitted signal with respect to the clock signal, analysis will be made to determine the average phase of the received signal with respect to the clock signal. The time $\Delta t$ required for the transmitted signal to be directed to and return from the object whose velocity is being measured is given by the expression:

$$\Delta t = \frac{2R}{C} = \frac{2(R_0 + Vt)}{C} \qquad (10)$$

where R equals the instantaneous range of the object whose velocity is being measured, $R_0$ is the initial position of the object, and V is the velocity of the object being measured. Thus, the returning or received signal originating from the transmitter 12 may be obtained from Equations 7 and 10 and expressed as follows:

$$V(t)_{r0} = h_0(t - \Delta t)\ \sin\ [(w_c + w_0)(t - \Delta t) + \theta_0] \qquad (11)$$

Similarly, the phase of the received signal is also detected at the center of the return pulse. As shown in FIG. 5, the received signal from the moving object is detected in the interval between $\Delta t - a/2$ and $\Delta t + a/2$. The phase of the received signal is measured with respect to the phase of the signal derived from the clock 24 by the phase detector 28 which provides an output signal $V(t)_{DR}$ representing the difference between the signals and which may be represented by the following expression:

$$V(t)_{DR} = h_0(t - \Delta t)\ \sin\ [(w_c + w_0)(t - \Delta t) + \theta_0 - w_c t] \qquad (12)$$

From inspection of Equation 12 and the graphical representation of FIG. 5, the average relative phase $\phi_R$ of the return signal with respect to the clock signal at time $t = \Delta T$, is given by the following expression:

$$\phi_R = \theta_0 - w_c \Delta t \qquad (13)$$

If we now subtract Equation 9 from Equation 13 the following expression is obtained:

$$\phi_T - \phi_R = \theta_0 - (\theta_0 - w_c \Delta t) = w_c \Delta t \qquad (14)$$

Up to this point, the analysis has been principally concerned with the description of the non-coherent transmitter of the instant invention. A coherent radar system is by definition a system in which the transmitted signal is phase related to the return signal. More specifically, the transmitted signal is derived from a clock mechanism which is also used to measure the frequency of the return signal thereby ensuring that the transmission and return signals will be in a fixed phase relation. A non-coherent system is on the other hand a system in which the transmitted and return signals are not derived from a common source and are not in a fixed phase relation. For a coherent transmitter, $w_0$ equals 0 by definition of coherence. From Equations 12 and 13, the return signal with respect to the clock signal (as provided by the phase detector 28) may be given by the following equation:

$$V(t)_{DR} = h_0(t - \Delta t)\ \sin\ (\theta_0 - w_c \Delta t) \qquad (15)$$

For the coherent case, $\theta_0$ is by definition a constant from pulse to pulse and so will disappear when in order to obtain a measure of velocity a subtraction process will be performed upon the measurement of the phase on successive pulses. Therefore, the data required from a coherent transmitter and a non-coherent transmitter will provide the identical information necessary to obtain the velocity of the moving object which is to be measured.

Figure 3:
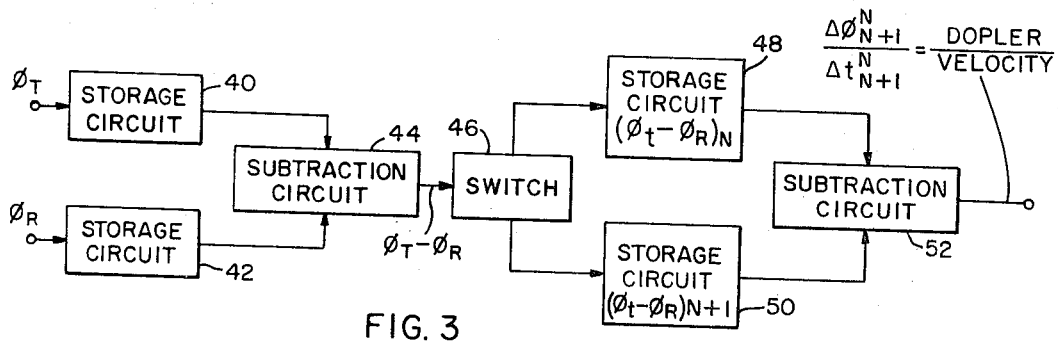
FIG. 3 is a schematic representation of a system for processing the information obtained from the radar system of FIG. 1.

In accordance with the teachings of this invention the round trip time $\Delta t$ between transmission of the signal from and the receipt of the echo is measured in terms of phase and with respect to a continuous clock signal. As shown in FIG. 1, the transmitted signal $V(t)_{T0}$ is measured with respect to the clock signal $V(t)_c$ by the phase detector 26. In a similar manner, the received signal $V(t)_{R0}$ is measured with respect to the clock signal $V(t)_c$ by the phase detector 28. Further, in order to determine the velocity of the relatively moving object 21, it is necessary to subtract the relative phase $\phi_T$ of the transmitted signal from the relative phase $\phi_R$ of the received signal to obtain a measurement of the round trip transmission time. Next, the difference between the round trip transmission times on successive pulses and then the rate of change of the round trip transmission time are measured as will be explained below. Referring now to FIG. 3, the relative phase transmitted signal $\phi_T$ and the relative phase $\phi_R$ of the received signal are respectively applied to storage circuits 40 and 42. It is understood that the signals $\phi_T$ and $\phi_R$ are received at different times and it would be necessary to momentarily store the signals until they are applied to a subtraction circuit 44 which supplies an output signal corresponding to the difference signal $\phi_T - \phi_R$. The difference signal $\phi_T - \phi_R$ is applied to a switch 46 which alternatively applies the difference signal $(\phi_T - \phi_R)_N$ for pulse N to a storage circuit 48 and then the next difference signal $(\theta_T - \phi_R)_{N+1}$ for pulse $N+1$ to a storage circuit 50. In other words, the difference signal $\phi_T - \phi_R$ for pulse $n$ is stored on storage circuit 48 whereas the different signals $\phi_T - \phi_R$ for pulse $N+1$ is stored on storage circuit 50. The signals held on storage circuits 48 and 50 corresponding to the phase difference signals for successive pulses are then applied to a subtraction circuit 52 which provides a signal indicative of the difference between transmission times measured in terms of phase for successive pulses.

An analysis will now be given of the processes carried out by the system shown in FIG. 4. The phase difference $\Delta\phi$ between the transmission of a signal from the radar system 10 and the receipt of the echo is given by Equation 14. If $\Delta t$ as provided by Equation 10 is substituted within Equation 14, the following expression results:

$$\Delta\phi = \phi_T - \phi_R = 2w_c/c(R_o + Vt) \quad (16)$$

The times of occurrence of the pulse $n$ and the pulse $n+1$ are approximately represented by Equations 17 and 18:

$$t_n = \frac{nP}{1 - \frac{2V}{C}} \quad (17)$$

$$t_{n+1} = \frac{(n+1)P}{1 - \frac{2V}{C}} \quad (18)$$

where P is the pulse repetition frequency and $V/C$ is less than $10^{-3}$. Thus, from Equation 16 the change of phase $\Delta\phi_n$ from time of transmission to the time of reception for pulse $n$ is given by the following expression:

$$\Delta\phi_n = w_o \frac{2}{C}(R_o + Vt_n) \quad (19)$$

and similarly, the change of phase $\Delta\phi_{n+1}$ for the pulse $n+1$ is given by the following expression:

$$\Delta\phi_{n+1} = w_o \frac{2}{C}(R_o + Vt_{n+1}) \quad (20)$$

Subtracting Equations 19 and 20, the difference in phase from pulse to pulse may be expressed as follows:

$$\Delta\phi_n - \Delta\phi_{n+1} = w_o \frac{2V}{C}(t_{n+1} - t_n) \quad (21)$$

As seen in Equation 3, the Doppler frequency may be expressed in terms of phase change per unit of time. Since the time period in which the phase change $(\Delta\phi_n - \Delta\phi_{n+1})$ takes place is $(t_{n+1} - t_n)$, the Doppler frequency may be expressed by the following equation:

$$f = \frac{\Delta\phi}{\Delta t} = \frac{w_o 2V}{C} \quad (22)$$

As a result, the velocity of the object being measured may be expressed in terms of the frequency of the clock signal $w_c$ generated by the clock mechanism 24 by the following equation:

$$V = \frac{\Delta\phi}{\Delta t} \cdot \frac{C}{2w_o} \quad (23)$$

Thus it has been demonstrated that the velocity of the object 21 may be measured in terms of the accurately controlled clock frequency $w_c$ with the use of a transmitter whose frequency is allowed to vary within limits and which may illustratively include such free running devices as magnetrons. From Equation 1, it may be seen that velocity could be expressed in terms of the frequency of the transmitted wave; it is a significant aspect of this invention, that velocity can be measured not in terms of the frequency of the transmitted wave but instead in terms of the phase of clock signal against which the transmitted and received waves are compared.

Typically the prior art conceived of a radar system for measuring a moving object in terms of radiating a continuous wave and receiving an echo therefrom whose frequency has been shifted due to the Doppler effect. The conceptualization of a continuous wave from the transmitter to the object and back again to the receiver has in effect created a mental block requiring the use of an extremely stable power amplifier such as a Klystron traveling wave tube.

Referring to FIG. 6, the conceptual difference between the radar system of this invention and the prior art may be graphically shown. In FIG. 6, the clock signal $V(t)_c$ is represented as a continuous wave having a defined, controlled frequency. At points $a$, $c$ and $e$ in time, pulses of the transmitted signal $V(t)_T$ are radiated out by the antenna 22 and that times $b$, $d$ and $f$, the pulses of the return or echo signal $V(t)_R$ are received. In accordance with the teachings of this invention, the transmitted pulses and the received pulses are measured respectively with respect to the continuous wave of the clock mechanism 24 to determine the phase difference therebetween. In order to graphically explain the principles of this invention, illustrative phases have been assigned to each of the transmitted and received pulses shown in FIG. 6. The vertical lines shown in FIG. 6 represent the points of time at which the measurements are taken. Illustratively, the instantaneous phase $\phi_T$ of the transmitted pulse and the phase $\phi_R$ of the received pulse are measured upon the vertical lines $a$, $c$ and $e$ and the vertical lines $b$, $d$ and $f$ respectively. In addition, the instantaneous phase of the continuous clock signal $\phi_C$ is measured at the times represented by each of the vertical lines $a$ to $f$. Further, as explained above, the relative phases of the received and transmitted pulses are measured with respect to the phase of the clock signal $V(t)_c$. Essentially, this process is one of subtraction or obtaining a difference. For example, the relative phase of the transmitted pulses with respect to the clock pulse at time $a$ is zero degrees whereas the relative phase of the received signal with respect to the clock wave $V(t)_c$ as measured at time $b$ is $-90°$. As a result, the change of phase between the time of transmission and the time of reception is illustratively $+90°$. In a similar manner, the change of phase between the transmitted pulse radiated at time $c$ and the received pulse at time $d$ may be found to be $0°$. Further, the change of phase between the pulse radiated at time $e$ and received at time $f$ is measured to be $-90°$. Therefore in the illustrative phase diagram shown in FIG. 6, the rate of phase change per unit of time (i.e. $\Delta\phi/\phi t$) from pulse to pulse is $-90°$ per unit of time. From Equations 22 and 23 the corresponding velocity may be calculated where the frequency of the clock mechanism and the velocity of transmission through the media are known.

Referring now to FIG. 4, there is shown a closed loop error prediction circuit for measuring the rate of change of the phase from pulse to pulse. The relative phase $\phi_T$ of the transmitted signal and the relative phase $\phi_R$ of the received signal are respectively applied to the storage circuits 40 and 42. In turn, the relative phases $\phi_R$ and $\phi_T$ of the received and transmitted signals are subtracted by the subtraction circuit 44. The output of the subtraction circuit 44 sequentially provides the phase difference between the received and transmitted signals for pulses N, N+1, N+2, etc. The closed loop, error prediction circuit includes a prediction circuit 70 for predicting the phase difference of the pulses N, N+1, etc., as they are received from the subtraction circuit 44. The prediction circuit 70 applies a signal corresponding to the predicted phase difference to a subtraction circuit 60 and an adding circuit 66. The subtraction circuit 44 is connected to the subtraction circuit 60, which provides to the divider circuits 62 and 64 an error signal indicative of the difference between the predicted and actual phase difference. The circuit 62 divides the error signal provided by the subtraction circuit 60 by a first factor and applies the resulting signal to the adding circuit 66. The circuit 64 divides the signal provided by the subtracting circuit 60 by a second factor illustratively the square of the first factor and applies a signal to a storage circuit 68. The storage circuit 68 retains or stores a signal corresponding to the rate of change of phase difference from pulse to pulse. The storage circuit 68 provides an output signal indicative of the rate of change of the hase difference between the transmitted and received pulses (i.e., the Doppler velocity) and in addition applies a signal corresponding to the rate of change of the phase difference to the adding circuit 66.

In operation at pulse N, the predicted phase difference is applied by the circuit 70 to the subtraction circuit 60, and an error signal will result if there is a difference between the predicted and actual phase difference signals. If there is an error signal, a corresponding signal is provided to the divider circuits 62 and 64. The divider 64 applies a reduced signal to the storage circuit 68 to thereby provide a corresponding correction in the rate of change of the phase difference signal stored by circuit 68. Likewise a reduced signal is provided by the divider circuit 62 to the adding circuit 66. The storage circuit 68 now provides a corrected output signal indicating the new Doppler velocity. The adding circuit 66 functions to sum a signal indicating the rate of change of the phase difference between pulses N and N+1 from circuit 68, a signal corresponding to the phase difference for pulse N from circuit 70, and a signal indicating the error of the predicted phase difference for pulse N provided by the divider circuit 62 to provide a corresponding signal to the prediction circuit 70. Thus the prediction circuit 70 can predict the phase difference for the pulse N+1 and a resulting signal is applied to the subtraction circuit 60. If the predicted phase difference of pulse N+1 is correct, a zero signal will be applied to the subtraction circuit 63 and thus to the divider circuits 62 and 64. Further, the signal provided by the stored circuit 68 indicating the rate of change of the phase difference from pulse to pulse will remain the same, thus indicating an accurate prediction of the Doppler velocity. Through this invention has been described as a system for measuring the velocity of a target, this system could be used in combination with a moving target indicator (M.T.I.) radar system. More specifically, the signal providing velocity information could be utilized by a M.T.I. radar system to suppress the display of stationary objects.

Since numerous changes may be made in the above-described apparatus and different embodiments of the invention may be made without departing from the spirit thereof, it is intended that all matter contained in the foregoing description or shown in the accompanying drawings shall be interpreted as illustrative and not in a limiting sense.

We claim as our invention:

1. A Doppler radar system including a free running oscillating source for providing a transmission signal, first means for propagating said transmission signal towards said object and for receiving from said object a return signal having a different frequency from that of said transmission signal due to the Doppler effect, a clock for providing a continuous signal of defined frequency, second means associated with said clock and said first means for providing a first signal indicative of the phase difference at the time of transmission between said continuous signal of said clock and said transmission signal, third means associated with said first means and said clock for providing a second signal indicative of the phase difference at the time of reception between said continuous signal of said clock and said return signal, and fourth means associated with said second and third means for obtaining the difference between said first signal and said second signal to provide a third signal indicative of the difference in phase of said continuous signal of said clock between the time of transmission of said transmission signal and the time of reception of said return signal.

2. A Doppler radar system as claimed in claim 1, wherein said free running source provides a transmission signal having a frequency substantially equal to that of said defined frequency.

3. A Doppler radar system as claimed in claim 1, wherein said second and third means take the form of a single phase detector and said system further includes switching means for alternately sampling said transmission signal and said return signal and for applying one of the aforementioned signals to said phase detector.

4. A Doppler radar system as claimed in claim 1, wherein said first means includes an antenna and a duplexer for alternatively connecting said source to said antenna and said antenna to said third means.

5. A Doppler radar system as claimed in claim 1, wherein there is included fifth means associated with said fourth means for measuring the change of phase between the successive pulses of said third signal.

6. A Doppler radar system as claimed in claim 5, wherein said fifth means includes a switch associated with said fourth means for receiving said third signal, said switch applying the successive pulses of said third signal alternatively to first and second storage means, said first and second storage means storing alternately said successive pulses of said third signal, and a subtraction circuit for obtaining the phase difference between said successive pulses of said third signal.

7. A Doppler radar system as claimed in claim 1, wherein there is included fifth means for predicing the phase difference with respect to said continuous signal of said clock between the time of transmission of said transmission signal and the time of reception of said return signal and for providing a fourth signal proportion to said predicted phase difference, and a subtraction circuit associated with said fourth and fifth means for providing a fifth signal indicative of the difference between said third signal and said fourth signals.

8. A Doppler radar system as claimed in claim 7, wherein there is included sixth means for predicting the rate of change of the phase difference from pulse to pulse and for providing a sixth signal proportional to said predicted rate of change of the phase difference, said sixth means being associated with said subtraction circuit to modify said sixth signal in response to said fifth signal, and seventh means responsive to said fourth, fifth and sixth signals for applying a seventh signal to said fifth means to thereby modify said fourth signal.

No references cited.

RODNEY D. BENNETT, *Primary Examiner.*

C. L. WHITHAM, *Assistant Examiner.*